(12) United States Patent
Georgiou

(10) Patent No.: US 10,773,317 B2
(45) Date of Patent: Sep. 15, 2020

(54) ROTARY CUTTING TOOL WITH AN INTERNAL COOLING CAVITY

(71) Applicant: 5ME IP, LLC, Cincinnati, OH (US)

(72) Inventor: George Georgiou, Tecumseh (CA)

(73) Assignee: 5ME IP, LLC, Cincinnati, OH (US)

( * ) Notice: Subject to any disclaimer, the term of this patent is extended or adjusted under 35 U.S.C. 154(b) by 0 days.

(21) Appl. No.: 16/117,110

(22) Filed: Aug. 30, 2018

(65) Prior Publication Data

US 2018/0369934 A1 Dec. 27, 2018

Related U.S. Application Data

(63) Continuation of application No. 15/115,725, filed as application No. PCT/US2015/014100 on Feb. 2, 2015, now Pat. No. 10,086,446.

(Continued)

(51) Int. Cl.
*B23B 51/06* (2006.01)
*B23Q 11/10* (2006.01)
(Continued)

(52) U.S. Cl.
CPC .......... *B23B 51/06* (2013.01); *B23Q 11/1015* (2013.01); *B23Q 11/1023* (2013.01);
(Continued)

(58) Field of Classification Search
CPC ... B23B 51/06; B23B 2251/12; B23B 51/042; B23B 51/0486; B23Q 11/1053;
(Continued)

(56) References Cited

U.S. PATENT DOCUMENTS 3,759,625 A * 9/1973 Iversen .................... B23C 5/241
408/188
5,092,716 A * 3/1992 Omi ...................... B23D 59/025
408/204

(Continued)

FOREIGN PATENT DOCUMENTS

EP 0579371 A1 1/1994
EP 0757604 2/1997

(Continued)

OTHER PUBLICATIONS

European Search Report for EP Pat. App. No. 18199914 .5, dated Jan. 17, 2019. 2 pages.

(Continued)

*Primary Examiner* — Eric A. Gates
*Assistant Examiner* — Chwen-Wei Su
(74) *Attorney, Agent, or Firm* — Reising Ethington P.C.

(57) ABSTRACT

A rotating cutting tool that is internally cooled by cryogenic coolant, the rotating cutting tool has a cylindrical body including: a central bore that extends along a longitudinal axis of the cylindrical body; a plurality of cold flow delivery paths formed from radial bores that fluidly communicate with and extend radially-outwardly from the central bore; longitudinal grooves that are formed along an outer surface of the cylindrical body extending along the longitudinal axis and fluidly communicating with the radial bores; a bushing having an inner diameter closely conforming to the outer surface of the cylindrical body allowing the bushing to concentrically fit over the cylindrical body and the longitudinal grooves to form longitudinal passageways extending from the radial bores to one or more exhaust ports formed in the bushing proximate a rear face of the cylindrical body; and a plurality of flutes for cutting a workpiece each having a cutting edge formed from the bushing.

20 Claims, 4 Drawing Sheets

Related U.S. Application Data

(60) Provisional application No. 61/934,257, filed on Jan. 31, 2014.

(51) Int. Cl.
  *B23P 15/28* (2006.01)
  *B23D 77/00* (2006.01)
  *B23C 5/28* (2006.01)
  *B23B 51/04* (2006.01)

(52) U.S. Cl.
  CPC ...... *B23Q 11/1053* (2013.01); *B23B 51/0486* (2013.01); *B23C 5/28* (2013.01); *B23D 77/006* (2013.01); *B23P 15/28* (2013.01)

(58) Field of Classification Search
  CPC ... B23Q 11/1023; B23Q 11/1015; B23C 5/28; B23C 2250/12; B23D 77/006; B23D 2277/02; B23D 2277/60; Y10T 408/45; B23P 15/28
  USPC .......................................................... 76/115
  See application file for complete search history.

(56) References Cited

U.S. PATENT DOCUMENTS

| | | | | |
|---|---|---|---|---|
| 5,733,076 | A | * | 3/1998 | Basteck ............... B23D 77/006 408/144 |
| 7,634,957 | B2 | * | 12/2009 | Ghosh .................... B23B 27/10 82/1.11 |
| 2005/0047879 | A1 | * | 3/2005 | Svensson ............ B23B 51/0486 408/59 |
| 2007/0086867 | A1 | | 4/2007 | Kesterson et al. |
| 2012/0093604 | A1 | | 4/2012 | Rozzi et al. |
| 2013/0034399 | A1 | * | 2/2013 | Omagari ................ B23C 5/109 409/136 |
| 2015/0174671 | A1 | * | 6/2015 | Maurer ................ B23B 51/042 407/11 |

FOREIGN PATENT DOCUMENTS

| | | |
|---|---|---|
| EP | 2554310 A2 | 2/2013 |
| JP | S476447 | 4/1971 |
| JP | H04240014 A | 8/1992 |
| JP | 2013035070 A | 2/2013 |

OTHER PUBLICATIONS

Japanese Office Action for JP Application No. 2018-194899 dated Oct. 16, 2019 (11 pages).

* cited by examiner

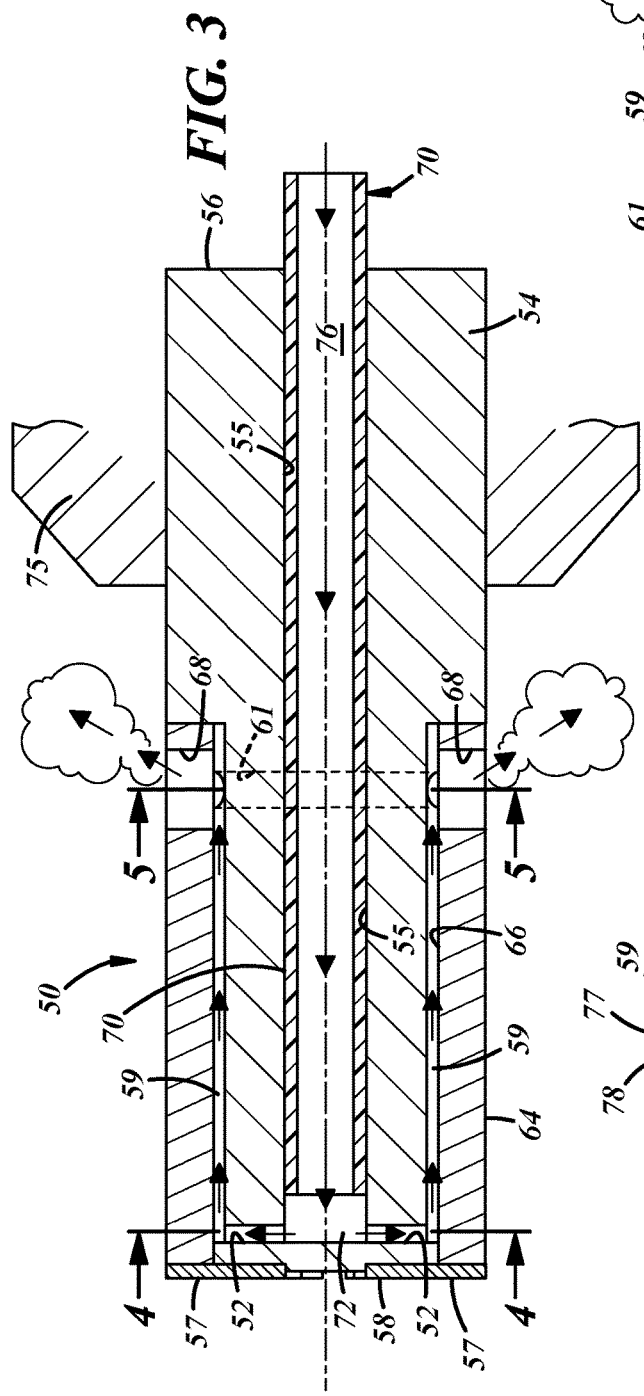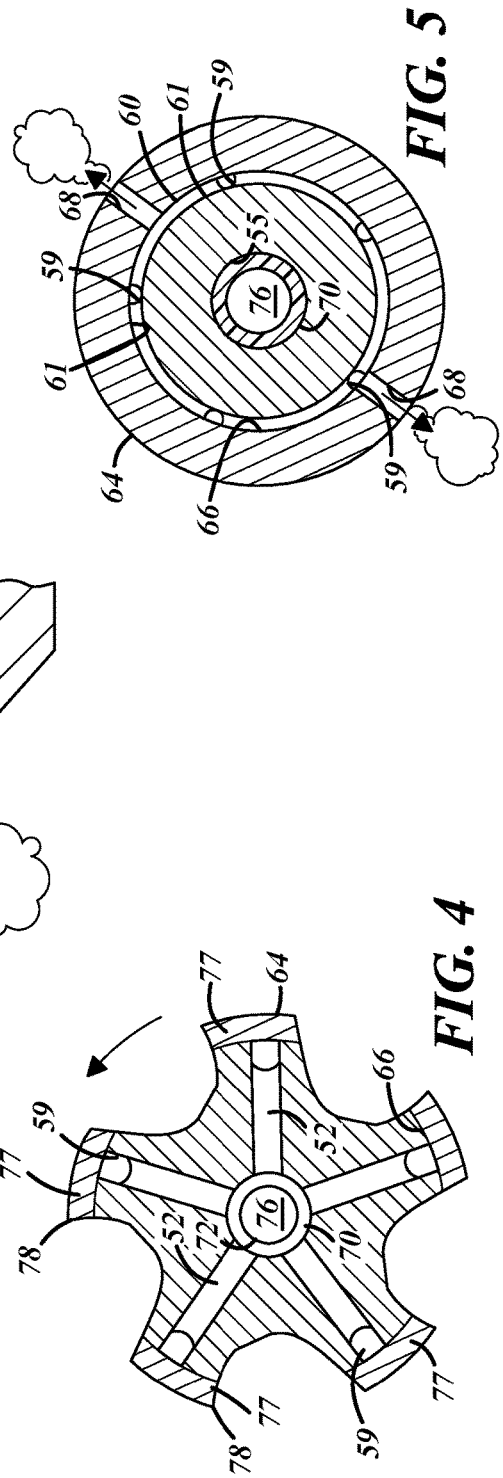

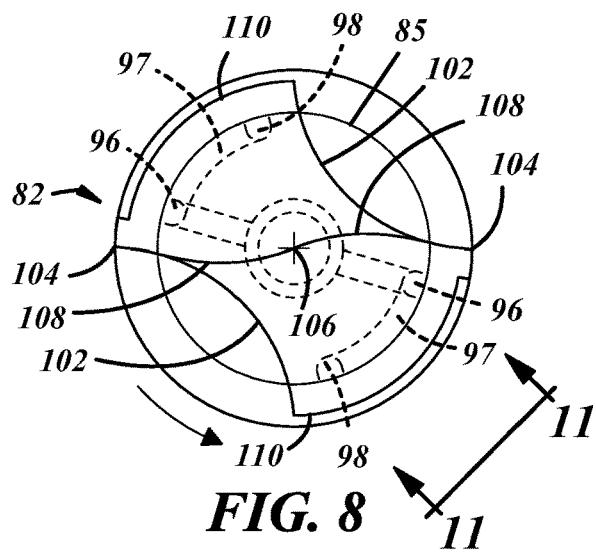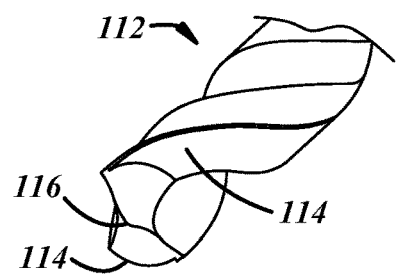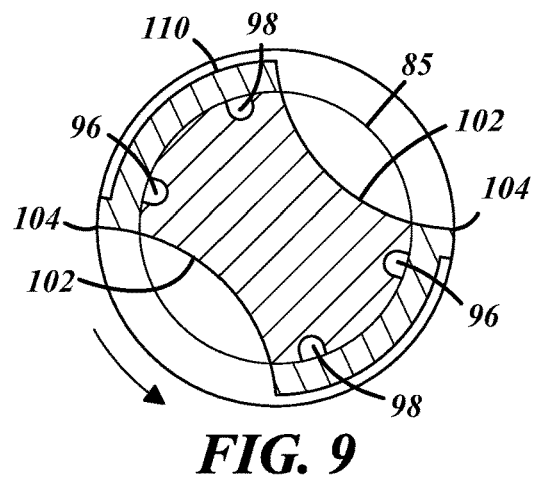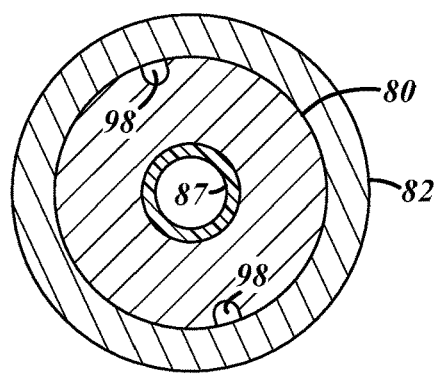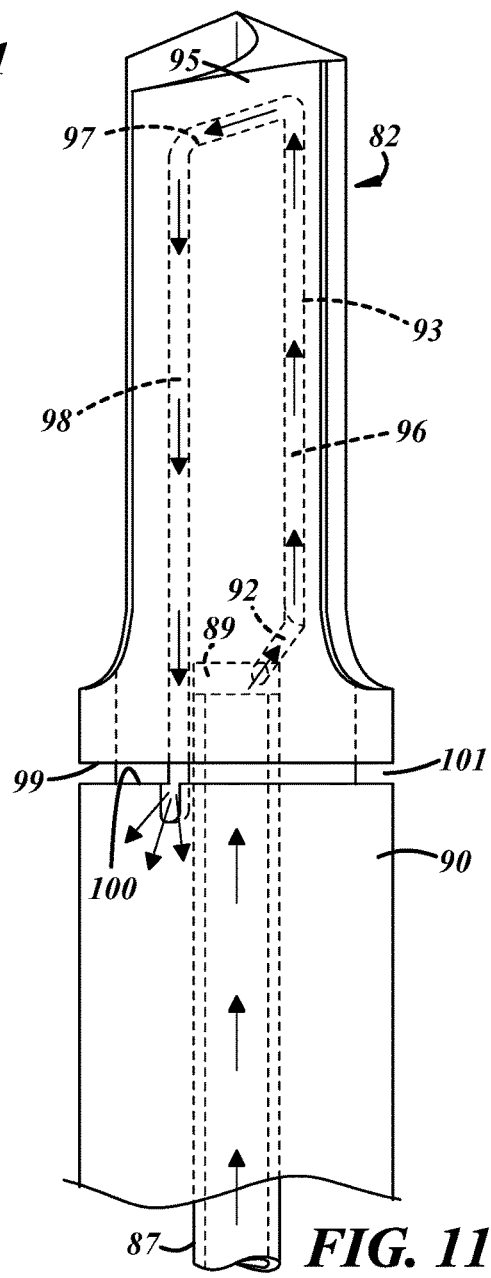
FIG. 8
FIG. 12
FIG. 9
FIG. 10
FIG. 11

ROTARY CUTTING TOOL WITH AN INTERNAL COOLING CAVITY

CROSS-REFERENCE TO RELATED PATENT APPLICATIONS

This application is a U.S. Continuation patent application, which claims the benefit of priority from 371 national phase U.S. Non-Provisional patent application Ser. No. 15/115,725 filed on Aug. 1, 2016, which claims the benefit of priority from Patent Cooperation Treaty International Application No. PCT/US15/14100 filed on Feb. 2, 2015, and U.S. Provisional Patent Application 61/934,257 for a Rotary Cutting Tool With an Internal Cooling Cavity filed on Jan. 31, 2014, the entire disclosures of which are incorporated herein by reference.

FIELD

The invention relates to a cooling flow path design for cryogenically cooled tools in which the shape of the flow path follows the outer shape of the tool, and the coolant is exhausted from the tool at a location that is remote from the workpiece.

BACKGROUND

Workpiece materials which have a hexagonal lattice structure such as inconel, titanium, cobalt, and the like toughen and become more difficult to machine when a cryogenic fluid is applied to the surface of the material. For this reason, it is advantageous to cool a cutting tool internally when using a cryogenic coolant rather than spray the cryogen coolant on the workpiece when machining such materials.

The increase in cooling on the cutting edge will allow an increase in cutting speed. For example, a 100% increase in cutting speed in titanium material will result in a 30% increase in heat. This means that a 30% reduction in heat at the cutting edge will allow the cutting edge to operate at twice the cutting speed without exceeding the original operating temperature. A tool that is operated at a cutting speed that is twice the original cutting speed can cut the same amount of material in half the time.

BRIEF DESCRIPTION OF THE DRAWINGS

FIG. 3 is a side view showing the assembled cutting tool.

FIG. 4 is a sectional view taken along lines 4-4 of FIG. 3.

FIG. 5 is a sectional view taken along lines 5-5 of FIG. 3.

FIG. 8 is an end view of the drill body and bushing of FIG. 7.

FIG. 9 is a sectional view taken along line 9-9 of FIG. 7.

FIG. 10 is a sectional view taken along line 10-10 of FIG. 7.

FIG. 11 is a perspective view of an assembled drill body and bushing taken along line 11-11 of FIG. 8.

FIG. 12 is a perspective view of a drill having twisted flutes.

DESCRIPTION OF THE PREFERRED EMBODIMENT

Figure 1:
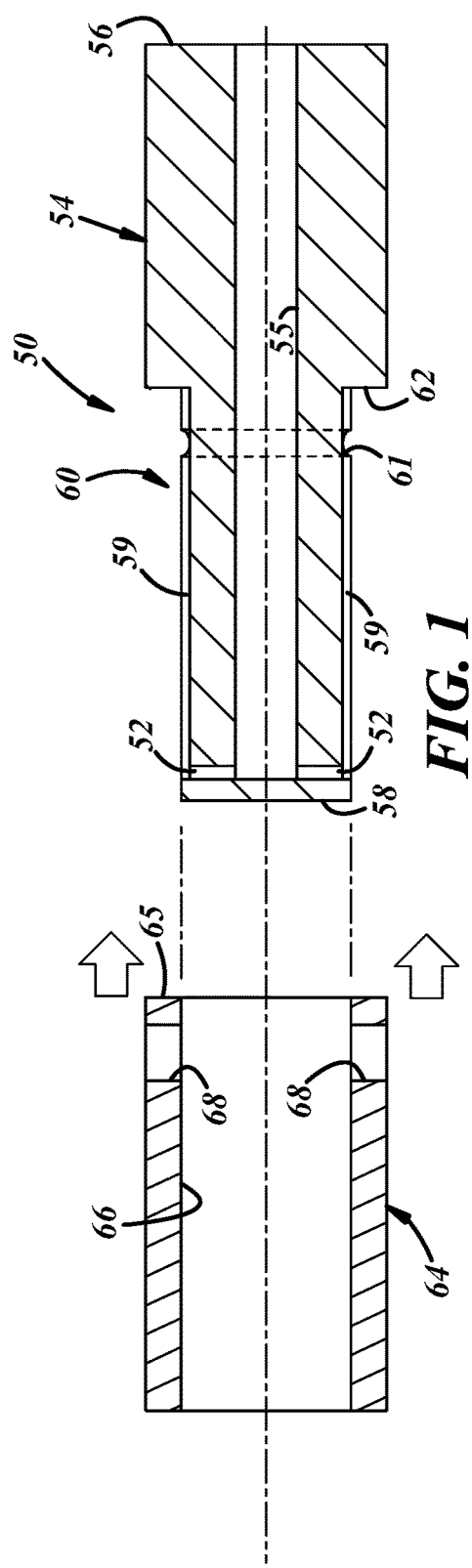
FIG. 1 is an exploded side sectional view of a cutting tool.

FIG. 1 is an exploded side sectional view of a cutting tool 50. The cutting tool 50 comprises a generally cylindrical body 54 having a central blind bore 55 that extends along the longitudinal axis of the cylindrical body 54 from the rear face 56 thereof to a position proximate the front face 58 thereof. Cold flow delivery paths are formed by radial bores 52 that may be formed proximate the front face 58 of the cylindrical body 54 and intersect the central bore 55. The cold flow delivery paths are located so as to be proximate the cutting edges that may be located on the front face 58. Longitudinal grooves 59 may be formed along a front portion 60 of the outer surface of the cylindrical body 54 from the radial bores 52 to a position toward the rear face 56. The longitudinal grooves 59 are downstream from the cold flow delivery path formed by the radial bores 52 and form a return path for cryogenic coolant. The longitudinal grooves 59 may intersect an exhaust manifold groove 61 that is formed around the circumference of the front portion 60. In the embodiment shown, the longitudinal grooves 59 may end at a shoulder portion 62 that is formed on the cylindrical body 54. The shoulder portion 62 has a diameter that is greater than the diameter of the front portion 60 of the cylindrical body 54 on which the longitudinal grooves 59 are formed. A bushing 64 may be inserted over the front portion 60 of the cylindrical body 54 until the rear face 65 of the bushing 64 abuts against the shoulder portion 62. The bushing 64 may have a bore 66 with an internal diameter that allows it to fit tightly over the front portion 60 of the cylindrical body 54. Exhaust ports 68 may be formed on the interior of the bore 66 proximate the rear face 65 of the bushing 64. The length of the bushing 64 may be approximately equal to the length of the front portion 60 of the cutting tool 50. With the bushing 64 in place, the longitudinal grooves 59 form longitudinal passageways that lead from the radial bores 52 in the front portion 60 of the cylindrical body 54 to the exhaust ports 68 formed proximate the rear face 65 of the bushing 64. The cylindrical body 54 and the bushing 64 may be formed from high speed steel, tool steel, carbide, or any other material normally used in the manufacture of cutting tool devices.

Figure 2:
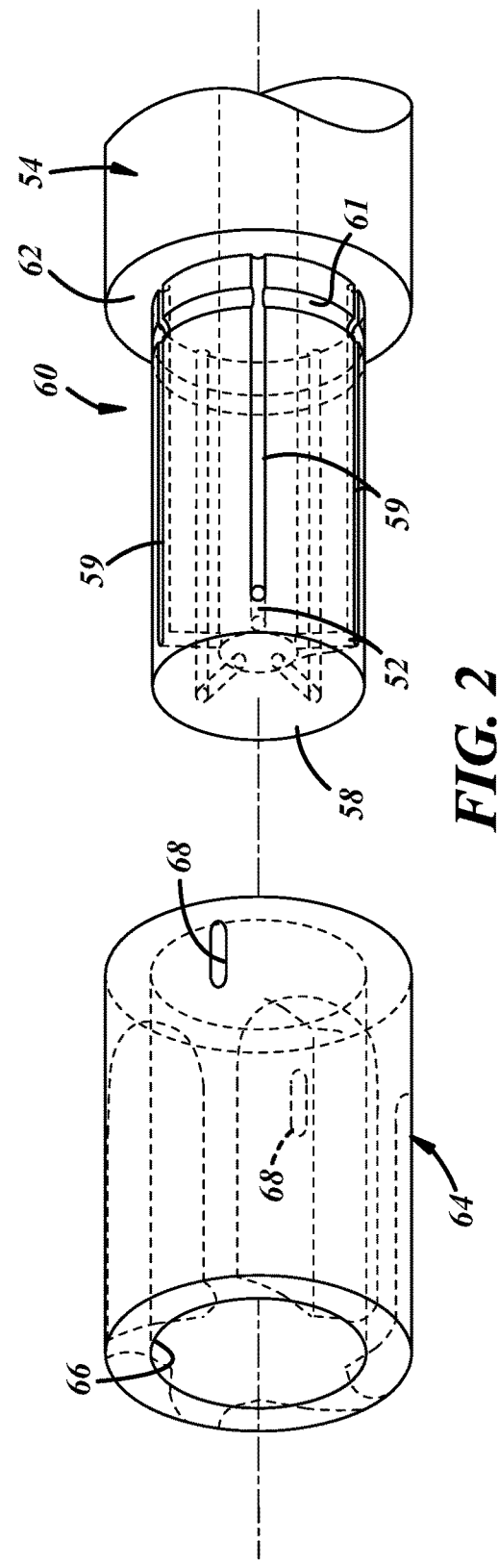
FIG. 2 is a perspective view of the core of the cutting tool and a bushing that mounts on the core.

FIG. 2 is a perspective view of the front portion 60 of the cylindrical body 54 and the bushing 64. Longitudinal grooves 59 may be formed along the front portion 60 from the radial bores 52 to the shoulder portion 62. The radial bores 52 intersect the longitudinal grooves 59, and the longitudinal grooves intersect the exhaust manifold groove 61.

FIG. 3 is a side view showing an assembled cutting tool 50. A sleeve of insulating material 70 having a through passage 76 may be placed in the central longitudinal blind bore 55. The sleeve of insulating material 70 is positioned in the longitudinal bore 55 to create a front coolant cavity 72 in the blind end of the bore 55, and proximate to the front face 58 of the cutting tool 50. The radial bores 52 couple the coolant cavity 72 to the longitudinal grooves 59. The insulating sleeve 70 may comprise polytetrafluorethylene (PTFE) or other suitable insulating material. The insulating sleeve 70 helps to maintain the cryogenic temperature of the coolant by retarding heat gain by the coolant that is delivered through the sleeve 70 to the front coolant cavity 72. The exhaust ports 68 in the end of the bushing 64 create exit vents at the end of the cutting portion of the tool 50 that lead from the exhaust manifold groove 61 to atmosphere, and direct the coolant away from the workpiece to prevent the coolant from cooling and toughening the workpiece. The cutting tool 50 may be mounted in a tool holder 75 so that the cutting tool 50 can be installed in a spindle in a conventional manner. At least one flute 57 may be formed on the front face 58 of the cutting tool, and as shown in FIG. 4, cutting edges 78 may be formed on the outer edge of the flutes 77.

In order to assemble the cutting tool 50 shown in FIG. 3, the front portion 60 may be machined to form the longitudinal grooves 59, and radial bores 52 may be formed to connect the grooves 59 to the front coolant cavity 72. For clarity, the longitudinal groves 59 are shown to be straight, but it will be understood that spiral grooves will be used if the final cutting tool is provided with spiral cutting edges formed on spiral flutes. The bushing 64 may then be fitted over the front portion 60 of the core. The assembled body 54 and bushing 64 may then be sintered to fuse them together. The front face 58 of the cylindrical body 54 and of the bushing 64 may be machined to form flutes 57, and the outer surface of the bushing 64 may then be machined to form flutes 77. The flutes 57 on the face of the tool may be sharpened and the flutes 77 on the outer cylindrical surface of the tool may be sharpened to provide the cutting edges 78. Alternatively, cutting edges 78 may be brazed or otherwise affixed to the ends of the flutes 57 and 77. The insulating sleeve 70 is then fitted into the blind bore 55 of the body 54. Other methods of assembly may be used.

FIG. 4 is a sectional view taken along lines 4-4 of FIG. 3. The radial bores 52 provide passages from the coolant cavity 72 formed in the end of the blind bore 55 to the longitudinal grooves 59 formed on the front portion 60 of the body. The radial bores 52 are positioned in alignment with and proximate to the flutes 57 that may be formed on the front face 58 of the cutting tool. The longitudinal grooves 59 are positioned in alignment with and proximate to the flutes 77 and the cutting edges 78 that are formed on the outer surface of the bushing 64. The coolant in the radial bores 52 and the longitudinal grooves 59 is effective in removing heat from the cutting edges on the front face 58 of the tool and the cutting edges 78 on the outer circumference of the tool. For simplicity, the flutes 77 in FIGS. 3 and 4 have been shown as being straight, but spiral flutes may also be employed. Because the flutes 77 are shown as being straight, the longitudinal grooves 59 are also shown as being straight, but it will be understood that in cutting tools having spiral flutes, spiral grooves may be employed so that the grooves follow the path of the flutes.

FIG. 5 is a sectional view taken along lines 5-5 of FIG. 3. The longitudinal grooves 59 are positioned near the outermost extremity of the flutes 77, next to the cutting edges 78 formed in the front portion of the tool body. The longitudinal grooves 59 vent back toward the tool holder and spindle and are vented to atmosphere through the exhaust ports 68. The exhaust ports 68 direct the coolant away from the front of the tool and prevent cooling and toughening the workpiece.

In use, a source of coolant is coupled to the rear face 56 of the cutting tool 50 and to the passage 76 that is formed in the sleeve of insulating material 70. The coolant flows from the rear face 56 of the tool 50 to a coolant cavity 72 formed at the end of a blind bore, and from the end of the coolant cavity 72 through the radial bores 52 into the ends of the longitudinal grooves 59 formed on the front part 60 of the tool. The coolant flows along the longitudinal grooves 59 from the front face 58 of the tool toward the rear face 56 until the coolant reaches the exhaust ports 68. The exhaust ports 68 form exit vents to atmosphere for the coolant, and direct the coolant away from the workpiece. The coolant that is used may be a cryogenic coolant such as liquid nitrogen having a temperature of −196° C., or other cryogenic coolants may be used. Non-cryogenic coolants may also be used. The coolant in the radial bores 52 and the longitudinal grooves 59 are much closer to the flutes and the cutting edges 57 on the face 58 of the tool and to the cutting edges 78 along the length of the tool than the coolant in the coolant cavity 72, allowing the cutting edges to operate at a lower temperature.

The flutes 77 in the outer surface of the tool 50 may be right handed, left handed, variable, staggered or straight without departing from the design described herein. In order to maximize the cooling effect of the coolant in the coolant cavity, the internal shape of the coolant cavity and the passageways for the coolant should closely follow the outer shape of the tool. In this way, the distance is minimized between the cutting edges of the tool, which is the heat source, and the coolant in the flutes 77, resulting in maximum heat absorption by the coolant in the cavity.

The device as shown may be applied to boring tools, drills, reamers, endmills, thread mills, taps, and pressed carbide inserts.

The centrifugal force developed by the rotating tool will force the coolant from the coolant cavity 72 to the outermost ends of the radial bores 52, and through the longitudinal grooves 59 to the exhaust ports 68.

Figure 6:
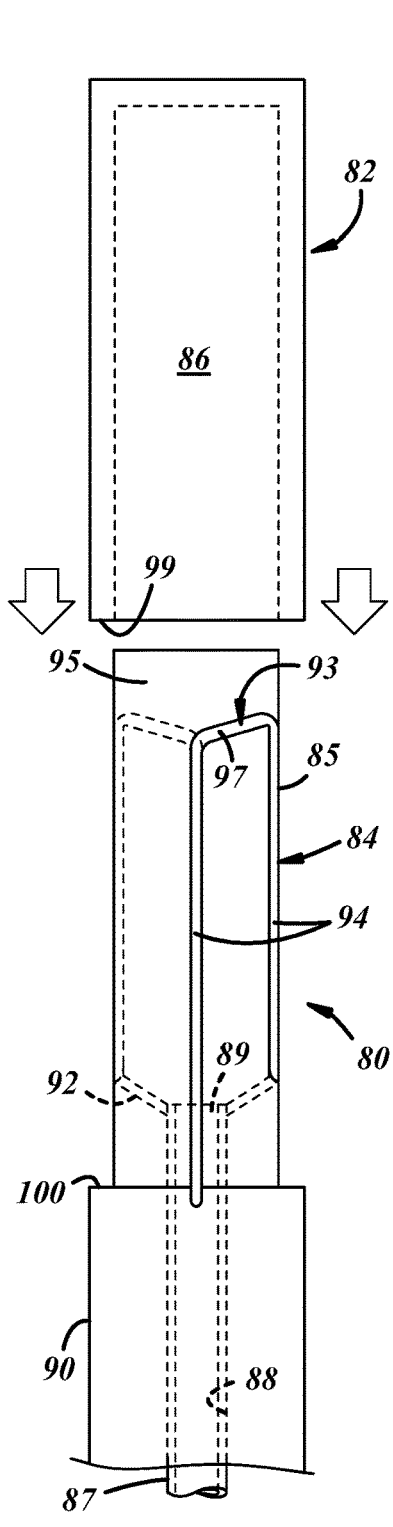
FIG. 6 is a side view of a drill body and a bushing that mounts on the drill body.
Figure 7:
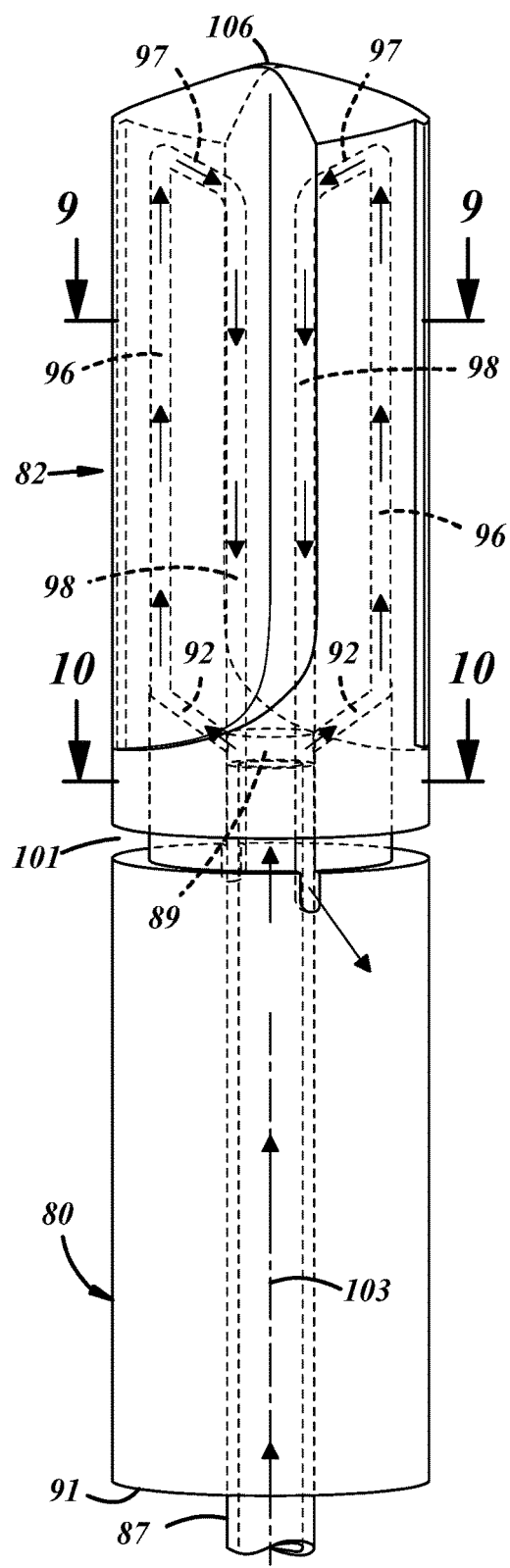
FIG. 7 is a side view of the assembled drill body and bushing of FIG. 6.

FIGS. 6-11 are directed to an embodiment of the device in which the cooling is applied to a cutting tool such as a drill. FIG. 6 is a side view of a drill body 80 and a bushing 82 that fits on the forward end 84 of the drill body 80 in order to produce a drill as explained more fully below. The forward end 84 of the drill body 80 has a reduced diameter portion 85 in order to fit into a blind bore 86 formed in the bushing 82. The blind bore 86 in the bushing 82 is dimensioned to be a tight fit over the reduced diameter portion 85 of the drill body 80. The drill body 80 has an axial blind bore 88 in the shank end 90 which extends from the end 91 of the drill body 80 as shown in FIG. 7 to the reduced diameter portion 85 at the forward end 84 of the body. Cross-drilled holes 92 are formed in the reduced diameter portion 85 from the outer surface of the reduced diameter portion 85 to a coolant cavity 89 formed at the end of the blind bore 88 in the drill body as explained more fully below. Grooves 94 may be formed along a portion of the length of the reduced diameter portion 85 to provide a path for coolant in the finished drill as explained more fully below. The grooves 94 may extend along a U-shaped path 93 from the cross-drilled holes 92 at the beginning of the cutting portion of the tool 80 to the tip 95 of the reduced diameter portion 85 and back toward end of the cutting portion of the tool. Each U-shaped path 93 may comprise a cold flow delivery path 96, a cross-over portion 97, and a return path 98. Each cold flow delivery path 96 may communicate with a cross-drilled hole 92, and each return path 98 may communicate with an exhaust gap 101 formed between the end 99 of the bushing 82 and the shoulder 100 formed on the shank end 90 of the drill body 80.

FIGS. 7 and 11 are side views of an assembled drill body 80 and bushing 82. A sleeve 87 of insulating material such as PTFE may be inserted into the blind bore 88 in order to insulate the cryogenic coolant from heat gain from the drill body 80. A coolant cavity 89 may be formed between the end of the sleeve 87 and the end of a blind bore 88 in the middle of the cutting tool, and the cross drilled holes 92 may intersect the coolant cavity 89. The outer surface of the bushing 82 may be machined to form drill flutes 102 as best seen in FIGS. 8 and 9, and the flutes 102 may be sharpened to form cutting edges 104. The cold flow delivery paths 96 extend along the axis 103 of the tool from the coolant cavity 89 to the tip 106 of the tool. The cross-over flow paths 97 are located at the tip 106 of the tool, and the return path 98 extends from the tip 106 of the tool to the shank end 90 of the tool.

FIG. 8 is an end view of the drill body 80 and bushing 82 of FIG. 7. The bushing 82 may be machined to form two flutes 102 along the length of the bushing, but other numbers of flutes may be formed on the bushing 82 as desired. A pointed tip 106 having cutting edges 108 is formed by the merger of the two flutes 102, and in operation, the cutting edges 108 surrounding the pointed tip 106 remove the greatest amount of material in a hole drilling operation. As a result, the cutting edges 108 and the pointed tip 106 become hotter during a cutting operation than the other portions of the drill, and consequently this portion of the drill benefits the most from cooling. The cold flow delivery path 96 is positioned to be in proximity to the cutting edge 104 of the flute 102 on the outer circumference of the cutting tool, and the return path 98 is adjacent to the trailing lip 110 of the flute. The cross-over portion 97 of each U-shaped path 93 connects the cold flow delivery path 96 to the return path 98, and is proximate to a cutting edge 108 of the pointed tip 106. The bushing 82 may be machined to form more than two flutes as well known in the art.

In order to produce the assembled drill of FIGS. 7-11, the bushing 82 is first fit onto the reduced diameter portion 85 of the body portion 80 of the drill. The bushing 82 and the reduced body portion 85 are then sintered to fuse them together. The flutes 102 are then formed on the bushing 82 and the flutes are finish ground in order to form the sharpened edges 104 of the flutes. The flutes 102 are formed on the outer surface of the bushing 82 so that the sharpened edges 104 of the flutes are adjacent to the cold flow delivery paths 96 formed on the reduced diameter portion 85 of the drill body 80, and the cutting edges 108 of the pointed tip 106. The sleeve 87 of insulating material is then inserted into the blind bore in the body portion 80.

In use, coolant enters the drill body 80 through the insulating sleeve 87 and collects in the coolant cavity 89 formed between the end of the insulating sleeve 87 and the end of the blind bore 88. The coolant in the coolant cavity 89 flows through the cross-drilled holes 92 to the cold flow delivery path 96, and from the cold flow delivery path 96 through the cross-over portion 97 to the return path 98, and from the return path 98 to the exhaust manifold groove 101 and to the exhaust ports 99 and to atmosphere. The cold flow delivery path 96 positions the coolant as close as possible to the sharpened flutes 104 of the drill and the cross-over portion 97 positions the coolant as close as possible to the cutting edges 108 at the tip of the drill to maximize the heat removed by the coolant from these areas of the drill. The return path 98 directs the coolant to the exhaust gap 101 that is located at the end of the cutting portion of the tool remote from the tip 106 of the drill so that the coolant can be exhausted to atmosphere and directed away from the workpiece. This prevents the cryogenic coolant from impinging on and toughening the workpiece. The coolant that is used may be a cryogenic coolant such as liquid nitrogen having a temperature of −196° C., or other cryogenic coolants may be used. Non-cryogenic coolants may also be used.

FIG. 12 is a perspective view of a drill 112 having flutes that are twisted. The drill 112 that is shown has two flutes 114 that are twisted to form a spiral. The flutes 114 terminate in a pointed tip 116. The construction shown and described in connection with FIGS. 6-11 may be applied to the drill having two twisted flutes as shown in FIG. 12. A drill having flutes that are twisted may also be made with more than two flutes as will be understood by those skilled in the art.

Having thus described the device, various modifications and alterations will occur to those skilled in the art, which modifications and alterations will be within the scope of the device as defined by the appended claims.

What is claimed is:

1. A rotating cutting tool that is internally cooled by cryogenic coolant, the rotating cutting tool comprising:
   a cylindrical body including:
      a central bore that extends along a longitudinal axis of the cylindrical body;
      a plurality of cold flow delivery paths formed from radial bores that fluidly communicate with and extend radially-outwardly from the central bore;
      longitudinal grooves that are formed along an outer surface of the cylindrical body extending along the longitudinal axis and fluidly communicating with the radial bores;
   a bushing having an inner diameter closely conforming to the outer surface of the cylindrical body allowing the bushing to concentrically fit over the cylindrical body and the longitudinal grooves to form longitudinal passageways extending from the radial bores to one or more exhaust ports formed in the bushing proximate a rear face of the cylindrical body, wherein the longitudinal passageways are configured to communicate cryogenic coolant solely from the radial bores to the exhaust port(s); and
   a plurality of flutes for cutting a workpiece each having a cutting edge formed from the bushing.

2. The rotating cutting tool recited in claim 1, wherein the cylindrical body is sintered with the bushing.

3. The rotating cutting tool recited in claim 1, wherein the longitudinal grooves are downstream from the cold flow delivery paths and form a return path for cryogenic coolant.

4. The rotating cutting tool recited in claim 1, wherein the longitudinal grooves are proximate the cutting edges.

5. The rotating cutting tool recited in claim 1, wherein the radial bores are formed proximate a front face of the cylindrical body.

6. The rotating cutting tool recited in claim 1, further comprising an exhaust manifold groove formed around a circumference of a front portion of the cylindrical body that intersects the longitudinal grooves.

7. The rotating cutting tool recited in claim 1, wherein the cylindrical body includes a shoulder portion and a front portion, wherein the shoulder portion has a diameter that is greater than the front portion.

8. The rotating cutting tool recited in claim 7, wherein the bushing is inserted over the front portion of the cylindrical body and moved axially until a rear face of the bushing abuts against the shoulder portion.

9. The rotating cutting tool recited in claim 1, wherein the cutting edge is brazed to the flute.

10. The rotating cutting tool recited in claim 1, further comprising a sleeve of insulating material positioned in the central bore.

11. A method of forming a rotating cutting tool that is internally cooled by cryogenic coolant, the steps comprising:
   (a) providing a generally cylindrical body having a central bore that extends along a longitudinal axis of the cylindrical body;

(b) forming a plurality of radially-outwardly-extending cold flow delivery paths formed from radial bores that fluidly communicate with the central bore;
(c) forming longitudinal grooves along an outer surface of the cylindrical body that extend along the longitudinal axis and fluidly communicate with the cold flow delivery paths;
(d) providing a bushing having an inner diameter closely conforming to the outer surface of the cylindrical body allowing the tool bushing to concentrically fit over the cylindrical body thereby creating longitudinal passageways formed at least partially from the longitudinal grooves and extending from the cold flow delivery paths to one or more exhaust ports formed in the bushing proximate a rear face of the cylindrical body, wherein the longitudinal passageways are configured to communicate cryogenic coolant solely from the radial bores to the exhaust port(s); and
(e) creating a plurality of flutes for cutting a workpiece each having a cutting edge formed from the tool bushing.

12. The method recited in claim 11, further comprising the step of sintering the cylindrical body with the tool bushing.

13. The method recited in claim 11, further comprising the step of positioning the longitudinal grooves downstream from the cold flow delivery paths thereby forming a return path for cryogenic coolant.

14. The method recited in claim 11, further comprising the step of positioning the longitudinal grooves proximate the cutting edges.

15. The method recited in claim 11, further comprising the step of forming the cold flow delivery paths proximate a front face of the cylindrical body.

16. The method recited in claim 11, further comprising the step of forming an exhaust manifold groove around a circumference of a front portion of the cylindrical body that intersects the longitudinal grooves.

17. The method recited in claim 11, further comprising the step of forming a shoulder portion and a front portion on the cylindrical body, wherein the shoulder portion has a diameter that is greater than the front portion.

18. The method recited in claim 17, further comprising the step of sliding the bushing over the front portion of the cylindrical body until a rear face of the bushing abuts against the shoulder portion.

19. The method recited in claim 11, further comprising the step of brazing the cutting edge to the flute.

20. The method recited in claim 11, further comprising the step of inserting a sleeve of insulating material in the central bore.

* * * * *